US00RE36426E

United States Patent [19]

Wiik et al.

[11] E Patent Number: Re. 36,426

[45] Reissued Date of Patent: Dec. 7, 1999

[54] TIME CONTROLLED LOCK SYSTEM

[75] Inventors: Tore Wiik, Jegerveien; Arild Pettersen, Moss; Malyor Aase, Moss; Torstein Tonnesson, Moss, all of Norway

[73] Assignee: TrioVing a.s, Norway

[21] Appl. No.: 08/555,500

[22] Filed: Nov. 8, 1995

Related U.S. Patent Documents

Reissue of:

[64] Patent No.: 5,260,551
Issued: Nov. 9, 1993
Appl. No.: 07/781,971
Filed: Oct. 24, 1991

[30] Foreign Application Priority Data

Dec. 3, 1990 [NO] Norway ..... 905222

[51] Int. Cl.[6] ..... G06K 5/00

[52] U.S. Cl. ..... 235/382; 235/382.5

[58] Field of Search ..... 235/382, 382.5, 235/380; 340/825.31, 825.34; 361/171, 172

[56] References Cited

U.S. PATENT DOCUMENTS

| | | | |
|---|---|---|---|
| 3,906,447 | 9/1975 | Crafton | 340/149 A |
| 4,385,231 | 5/1983 | Mizutani et al. | 235/382 |
| 4,450,535 | 5/1984 | de Pommery et al. | 364/200 |
| 4,519,228 | 5/1985 | Sornes | 235/382.5 |
| 4,562,343 | 12/1985 | Wiik et al. . | |
| 5,089,692 | 2/1992 | Tonnesson | 235/382.5 |

FOREIGN PATENT DOCUMENTS

| | | | |
|---|---|---|---|
| 1236200 | 5/1988 | Canada . | |
| 0049650 | 4/1982 | European Pat. Off. | 235/382 |
| 0028965 | 5/1984 | European Pat. Off. | 235/382 |
| 0122244 | 10/1984 | European Pat. Off. . | |
| 0127424 | 12/1984 | European Pat. Off. | 235/382.5 |

*Primary Examiner*—Thien Minh Le
*Attorney, Agent, or Firm*—Bierman, Muserlian and Lucas

[57] ABSTRACT

A lock system, comprising at least one off-line lock and at least one key, e.g. as a key card with encoded data, said lock including an electro/mechanical locking mechanism which can be affected by the key, and a key reader enabled to read the encoded data on the key, memorize said data and compare these data with data stored in the key reader for the purpose of, depending of certain comparable data, affecting the locking mechanism. The data used in the system comprise user identification, lock identification, valid time window and also override criteria e.g. time related criteria for invalidating prior used keys.

10 Claims, 5 Drawing Sheets

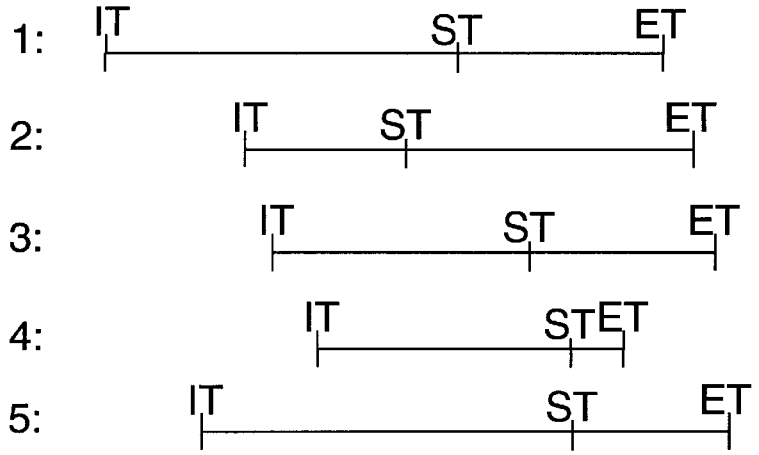
FIG. 5
FIG. 6
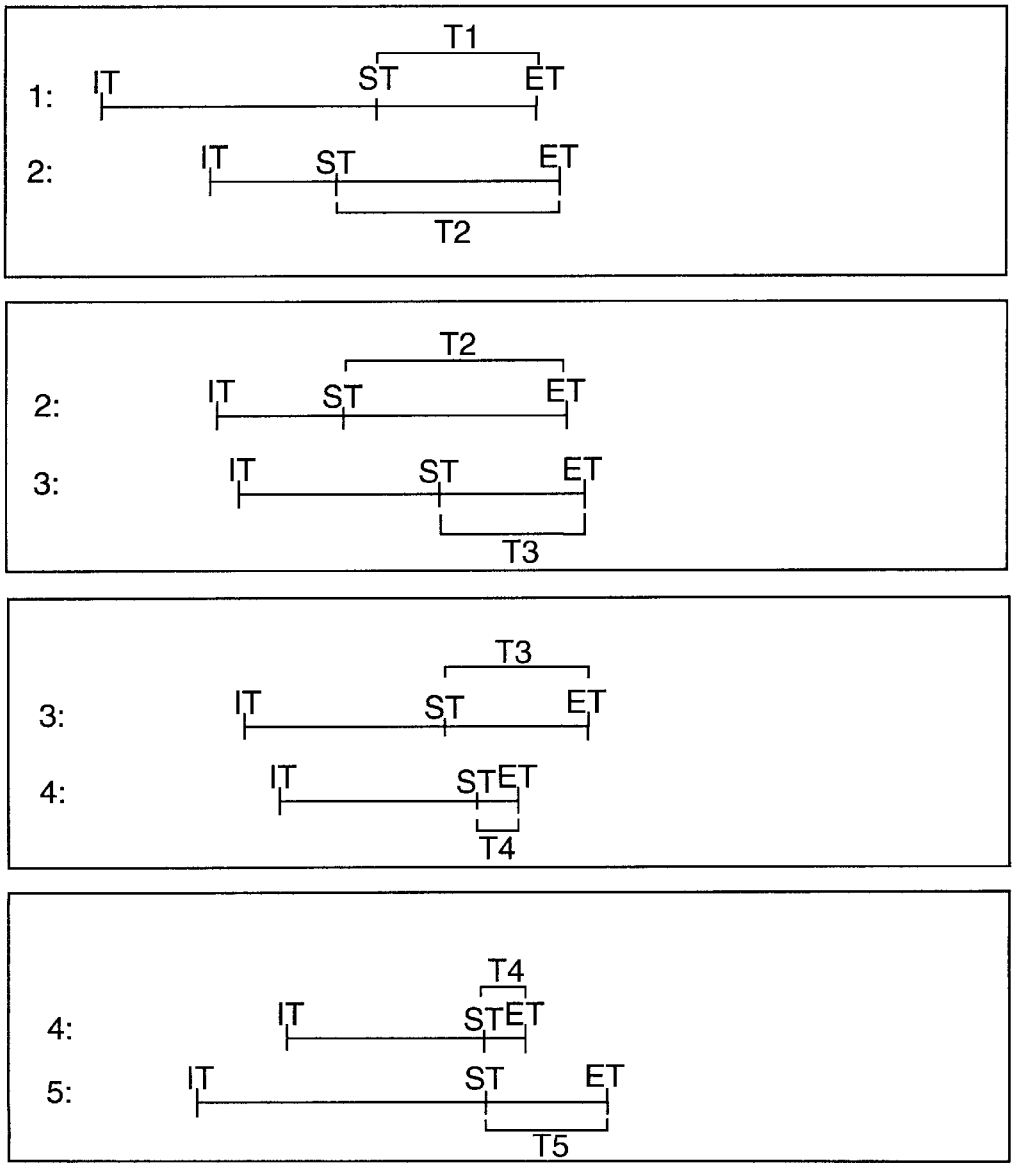

TIME CONTROLLED LOCK SYSTEM

Matter enclosed in heavy brackets [ ] appears in the original patent but forms no part of this reissue specification; matter printed in italics indicates the additions made by reissue.

FIELD OF THE INVENTION

The present invention relates to a lock system intended for locking rooms to which a limited number of persons are permitted access over a spaced period of time. Such rooms may include hotel rooms, cabinet rooms on ferries and cruise liners, safes and drink cabinets in such guest rooms and other facilities in hotels, lodging properties and ships. The system may also be advantageously used in other type of buildings such as office or other commercial buildings.

PRIOR ART

Conventional locks and keys are not totally satisfactory security devices for such rooms since the keys can be readily stolen or copied. Moreover, the holder of the key is often prone to forget to return it or he may misplace it so the key may be lost when his, or hers, allotted period has expired.

In order to overcome the mentioned disadvantages, especially for hotel rooms, there are several types of card operated locks on the market where the card and lock code can easily be changed for each guest. The electronically operated locks can be operated in a way that the code is automatically changed by issuing a new card to the guest. It is most often operated by the means of a digital code magnetically encoded on the card. The lock reads the code when inserted in the lock and the card informs the lock to accept the new card, or reject it and/or reject the present valid card. Locks of that type are described in e.g. U.S. Pat. No. 3,906,447; European Patent No. 122,244; European Patent Application No. 43270; or U.S. Pat. No. 4,562,343.

These prior art lock systems are encumbered with several disadvantages especially when used in hotels and cruise liners where it must be possible to authorize a guest to open a given lock for a specific period of time.

The guest may lose his card or decide to leave the hotel before the end of said period of time. It should therefore be possible in a simple manner to issue a new card for opening the same lock and automatically cancelling the former card before the expiration of said specified period of time. Prior art lock systems also have their shortcomings when there are several card issuing stations geographically apart. A hotel could have e.g. a check-in station at the airport and another at the hotel. A cruise liner could have check in stations ashore and aboard the ship.

In such cases it is desired, as the card issuing stations do not communicate with each other, that one of the stations has override criteria implemented in the code, and it is also desirable to have the opportunity to change this override criterion.

SUMMARY OF THE INVENTION

The object of this present invention is to provide an improved lock system of the aforementioned kind, which has an improved utility and provides a more simple way of issuing new cards at any time and at different issuing stations not in communication[,] with each other and without any central data store for the legitimacy codes for previously issued cards being required.

It is also an object to provide a flexible lock system where the customer can have different options so as to use a chosen amount of the possible features the lock system contents.

TERMINOLOGY

In the description of the invention some basic terminology will be used:

Card ID

Each card is given a card identification number to distinguish it from other cards with access to the same room. The card ID may be used to separate two guests in the same room or different employees. The lock read-out will print the card ID's of the individual accesses.

Access Criteria

Access criteria are written on the key card. The access criteria are: Property code, Card validity time window, Doors/door groups and corresponding time zones, and User groups. Based on these criteria each lock will determine if access will be granted.

Locks may either, a: check for property code (a specific hotel), time window (valid time), door and user group only (function A) or b: in addition check to see if the inserted card has been cancelled by another card or locked out by a lock-out card (function B)

Function A is typical for common area doors, where numerous people have access and security requirements are not very high, while function B is typical for guest room doors. In function B a newly inserted card with approved access criteria may override a current or former card depending on the override criterion. This override makes it possible for a new card to cancel a currently valid card, even though the valid card still is within its time window. The lock determines from the information on the card whether access should be given according to function A or function B rules.

Override Criteria (OC)

Override criteria may be either point of time for card issue or start time of time window. Each lock channel is set to work on one of these criteria. A card may also be given a "non-override-flag" (override inhibit). If the value of the override criterion for a card is greater than the recorded value for the current valid card, the current valid card will be cancelled by the new card.

Card Issue Time (IT) as Override Criterion

This is a normal override criterion in a hotel situation. Any card issued for a certain time and with a valid time window will override and cancel a valid card for the same lock channel if it is issued at a later period in time AND has a later or the same start time. If the former card's time window has expired, the only condition is that the new card has a later start time.

Card Start Work Time (ST) as Override Criterion

This is the normal override criterion in ships, ferries, cruise liners etc. The reason is that issuing time in these cases is more random, and that the time window has to be indicated with some slack. A card will only override if its start time is later than the former card.

Far-away Issuing

Cards issued in far-away issuing areas will override depending on the OC-value. In order to prevent mistakes caused by this, it is possible to set an override inhibit-flag at some issuing areas. The override inhibit-flag will be automatically recorded on cards issued at these issuing areas. Note: Issuing area can be areas like lobby, airport, travel agency or another hotel in the same hotel chain. Override inhibit is a possibility in those cases where the coordination between the far-away issuing stations is bad. If the coordination is good it might often be advantageous to use the IT as override criterion.

Property Code

To prevent cards from operating in more than one hotel the property code recorded on the card and the property code stored in the lock have to correspond. There are 100.000 different property codes available in the present design.

Card Validity Time Window

The start work time (ST) and the stop work time (ET) of a card is written on the magnetic stripe. The lowest resolution is 30 minutes, allowing a 1 month time window and advance issuing 1 year ahead. The highest resolution is 24 hours, allowing a 4 year time window. The resolution is written on the magnetic stripe.

Doors/Door Groups/Lock Channels

Access to a maximum of 3 doors or door groups operating in function B can be explicitly addressed on the card. Doors and door groups will in the lock be referred to as lock channels. Each lock will respond to a maximum of 10 door names or door group names. A lock will e.g. recognise its address "room 303". It will also recognise its group "3rd floor". A door group is in popular terms similar to a section operated by a certain key level. In this set-up, however, a strict hierarchy is not necessary. FIG. 1 shows an example of a door group structure. In addition to those doors/door groups explicitly addressed on the card, a higher number of doors can be accessed from the card's access bit map. The access bit map describes in a very compact bit-wise format to which of the doors operating in function A that access is allowed. These kinds of doors will typically be perimeter doors, i.e. doors for garage, health club, pool, VIP-floors, etc. There are provided several user[,] as well as design advantages as the access bit map gives compact information with respect to a large number of doors. Descriptions of lock channels would otherwise and normally require very much space both on cards and in locks. The access bit map learns this in concentrated form.

Time Zones

In the system there are 8 time zones, stored internally in the lock described by a time zone bit map, marking access or no access during the week plus one additional holiday. The resolution is 30 minutes, regardless of time resolution factor. Access to a door operating in function B (or actually a lock channel) is restricted to a time zone explicitly written on the card. In addition a lock channel can allocate one of the 8 time zones to toggle itself between "always open" and "card operated" according to the time zone bit map (internal control mode).

User Group/Time Zone Table

For the locks operating in function A it is the user groups which have been assigned a time window as an additional restriction in time. There can be maximum 32 user groups in the system. Typical user groups are VIP-guests, regular guests, chamber maids, security personnel, management etc.

There exists in the lock's RAM a table assigning each of the 32 user groups to one of the 8 time zones. This time zone table can be set up individually for each lock in the system.

Weekday Bit Map

The weekday bit map is printed on the key cards per lock channel. The weekday bit map is useful in those cases where one key card is to be validated for one travel between more than one, and maximum three properties. The card time window gives a full time window covering all maximum 3 stays. The first day in the weekday bit map allows access from a certain point in time (e.g. 1300), and the last day of the weekday bit map allows access up to a certain time the following day (e.g. 1100). This start-first-day time and end-last-day time is set up in the configuration. The locks can be set up to accept more than one property code (key card type 1 only) in the configuration.

Deadbolt Override

Cards can be assigned deadbolt override to certain lock channels. Typically a housekeeper's card is given deadbolt override to all rooms in the housekeeper's section. The deadbolt function is a mechanical function operated from inside the room and excluding all guests' and maids' cards and indicating a do not disturb signal.

Lock Configuration

Each lock has to be configured after installation with the information shown in table no. 1. This information is first set up in the CPU and downloaded to the lock communicator. The lock communicator is the tool which in turn is used to download the information to each lock, as it is carried around and inserted in each lock.

Back-up Cards

Back-up cards are cards which will be programmed into the lock when it is impossible to issue new cards using the CPU or Check-in terminals (CIT). In order to encode one back-up card, or a sequence of 10 back-up cards, the lock has to be set in programming mode by a command card. After the lock has been set to programming mode the lock will accept an inserted back-up type card, provided the property code is correct. The back-up card information is stored in a separate back-up channel in the lock controller. The information stored on the back-up cards is disclosed under the heading "CARD SPECIFICATIONS".

The lock case is [1 lock case] standard type with latch and dead bolt functions. There is an additional door close read relay in order to implement ALC (Automatic Locking Control).

Lock Controller

The lock controller with a battery is an integrated part of the escutcheons connected to the lock case and the door. The RAM contents:

Lock identity

Property code

For 10 lock channels: logical lock channel number

IT, ST, ET, inhibit flag, Access bit map position

Time zone bit map

Read out

User group/time zone table for access bit map

Black list

Configurations

Table no. 1. Shows the configurations which have to be set up in the lock upon the initial start-up of the installation.

Black list

A black list in RAM, with a capacity of 20 user ID codes, can be used to immediately cancel individual cards in a lock. The lock communicator is used to fill the list with black listed card ID's. The lock communicator also has an un-black-list function.

General override criteria

General expressions for Card(n+1) to override Card(n) are:

1. If IT is OC: If Card(n) in (ST..ET) and (IT(n+1)>IT(n) and ST(n+1)>ST(n) then override, else if ST(n+1)>ST(n) then override.

2. If ST is OC: If ST(n+1)>ST(n) then override Card(n+1) must be within its time window in both cases.

CARD SPECIFICATIONS Information

The information which can be recorded on the card is:

Key card

Key type
Property code
Time resolution factor
User group
Issuing area code
Override inhibit flag
User ID code
IT, ST, ET
Lock channel (door) description
Corresponding time zone
Weekday bit map (if used)
Dead bolt override
Access bit map

LOCK COMMUNICATOR

The lock communicator consists of a small MS-DOS® compatible computer and a lock link. MS-DOS is a registered trademark of Microsoft Corporation. The information sent from the lock to the lock communicator, when read out is initiated, is processed in the lock communicator where it can be displayed stepwise or printed by connecting a small printer. The information available is:

General access by card: Time, User ID code, issue area code, user group, new key/old key, card type, value of OC, dead bolt overridden as well as other desired informations.

The lock communicator will also be used for configuring the lock with all the information necessary before a system start up. The use of the lock communicator for programming and configuration may be password protected. The property code transmitted from the lock communicator is scrambled in order to prevent unauthorized pick-up of the information.

DESCRIPTION OF THE FUNCTION

In order to facilitate the understanding of the present invention, the lock system will be described with reference to its use in a hotel, although it is to be understood that the lock system is not limited to this use alone, having a more general application. The system could also be applicable to other areas as mentioned in the introduction.

The present invention provides for alteration of the stored key code in the lock by incorporating on the key issued to the authorized user what is termed herein as different codes e.g. ID code, Property code, Time zone, etc., which upon inserting in the lock causes the lock to be set to the key code on the key of the authorized user. Thereafter, each time the user presents the key to the lock, he is permitted to enter during the specific time period in which the key predetermingly is valid.

BRIEF DISCLOSURE OF THE DRAWINGS

FIG. 1. shows the hierarchical door structure in the system, such a structure being well known in traditional mechanical Masterkey systems.

FIG. 2. shows the layout of the check-in system at a hotel.

FIG. 3. shows a layout of an typical installation, some of the locks being in an on-line network and some locks being in an off-line position, the preferred and most advantageously installation for the present invention being, however, an off-line installation.

FIG. 4. shows a cross section of the door with the physical embodiment of lock and lock controller.

FIG. 5 shows a flow chart of the function in the lock controller, and

FIG. 6 and FIG. 7 show graphically the described functions of the Override Criteria.

DISCLOSURE OF EMBODIMENTS

Figure 1:
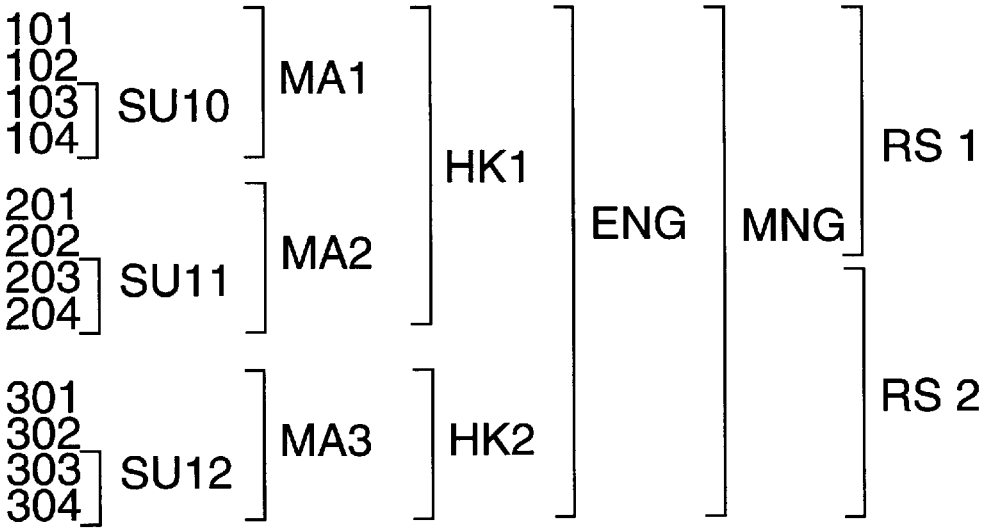

FIG. 1 shows a door group structure for door 303, 303, Su12, MA3, HK2, ENG, MFG, and RS2 are all lock channels activated in the lock of door 303. The abbreviations are identified in the following Table A.

Table A

SU=Suite
MA=Maid
HK=Housekeeper
ENG=Engineer
MNG=Manager
RS=Room service

Figure 2:
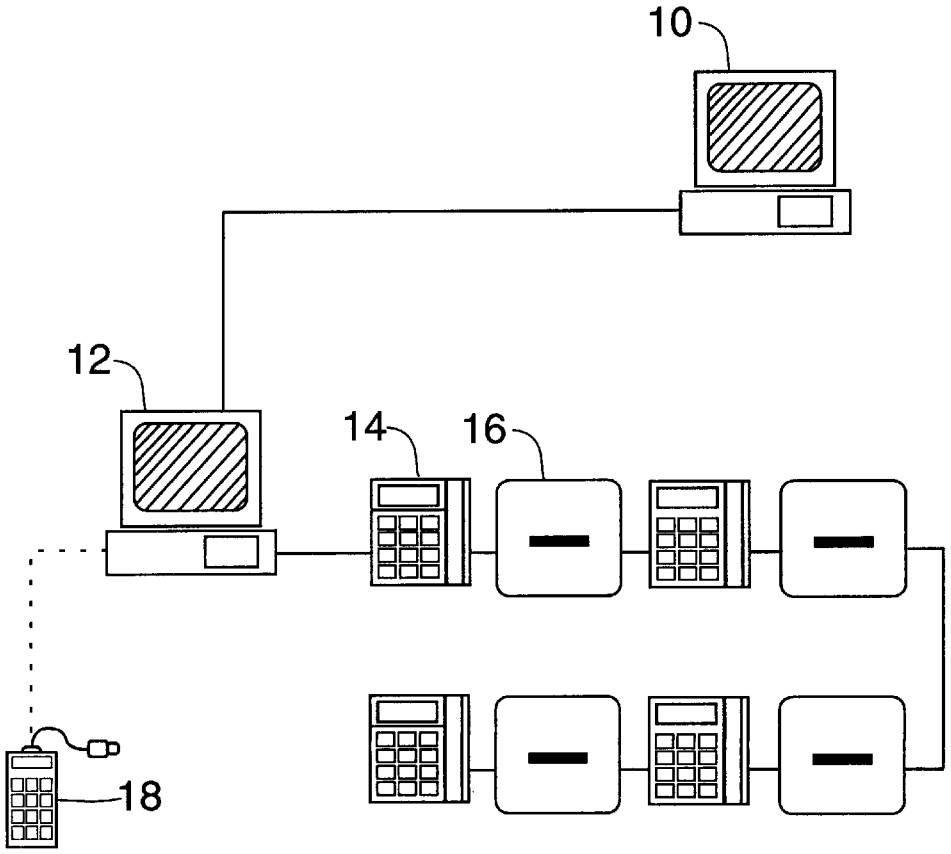

FIG. 2 shows a check-in area system layout. The PMS 10 is connected to the central processing unit (CPU) 12. The CPU 12 is connected to at least one check-in terminal (CIT) 14. The CIT 14 is connected to an encoder 16. The lock communicator 18 may also be connected to the CPU 12.

Figure 3:
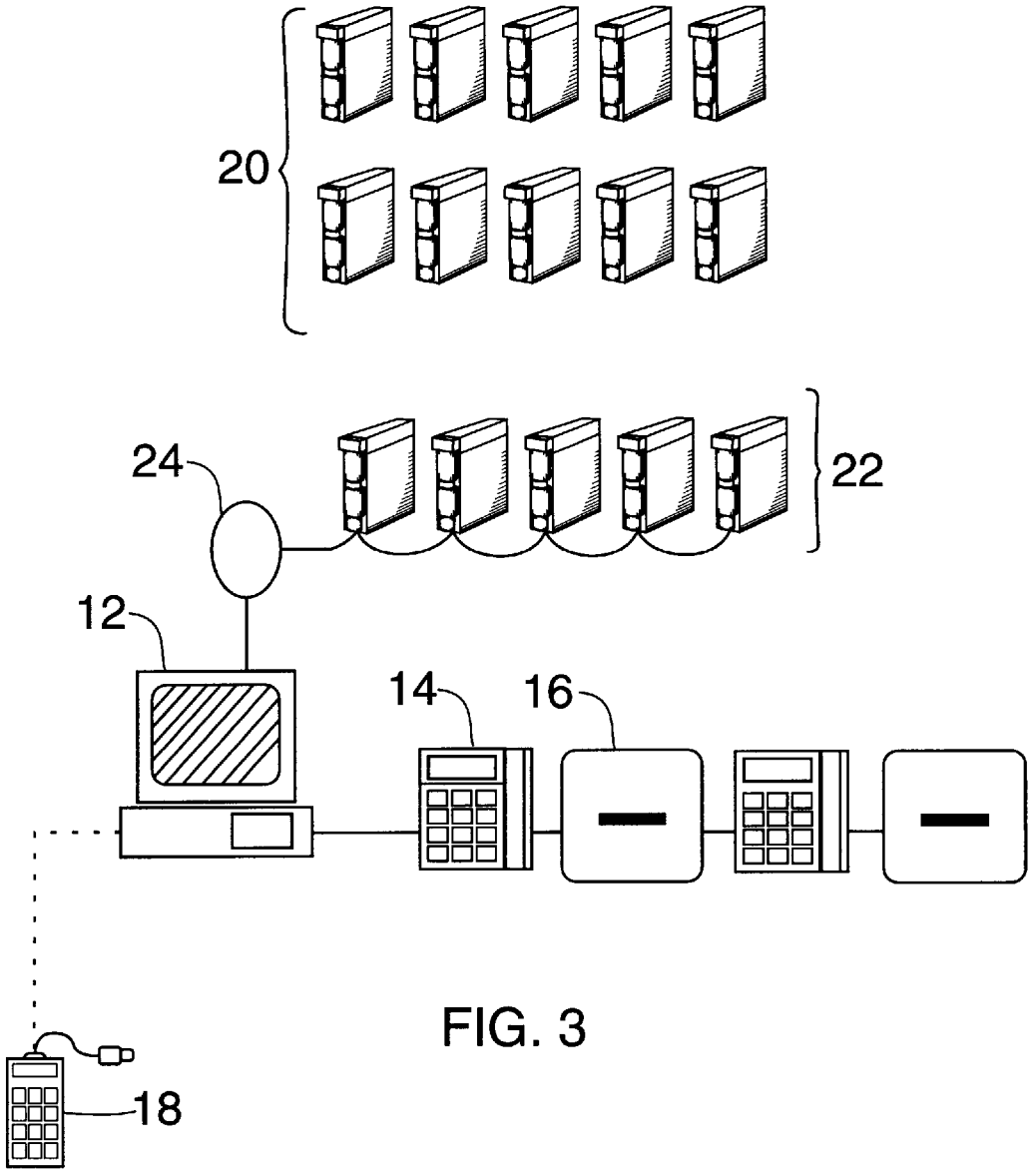

FIG. 3 shows a typical installation layout. Off-line locks 20 and on-line locks 22 are shown. On-line locks are connected to CPU 12 through OCU 24.

Figure 4:
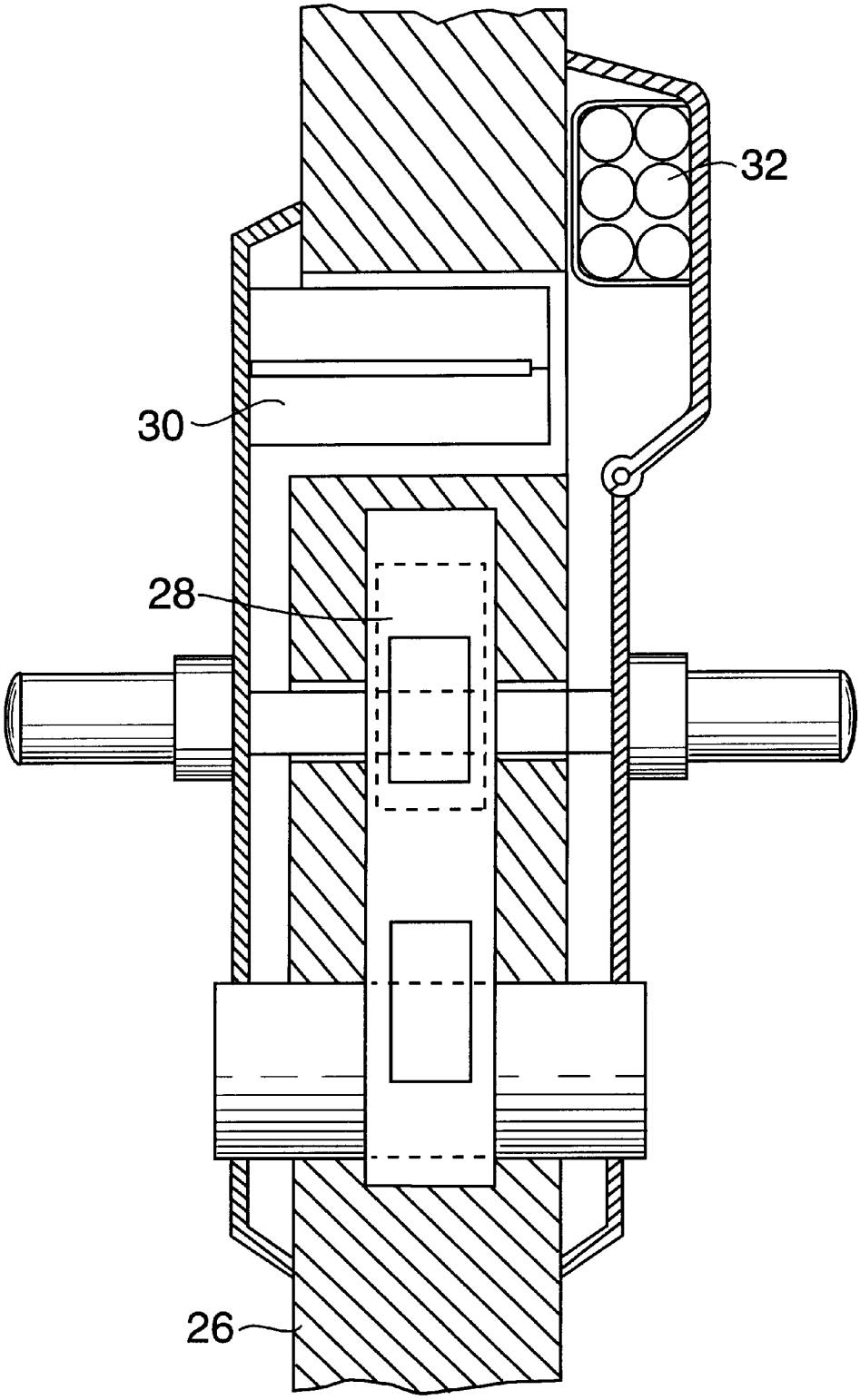

FIG. 4 shows a cross section of door 26 having lock 28 therein. Lock controller 30 contains the data encoded in the lock. Battery 32 is also in door 26 and is the energy source for the lock controller.

FIG. 6 shows a comparison of override scenarios if the start work time (ST) is used as the override criterion.

Comparing scenario 1 with scenario 2, card 1 will override card 2 because of the later ST. After the use of card 1, card 2 will not be accepted.

Comparing scenario 2 with scenario 3, card 3 will override card 2.

Comparing scenario 3 with scenario 4, card 4 will override card 3.

Comparing scenario 4 with scenario 5, the first card inserted will exclude the other.

Figure 7:
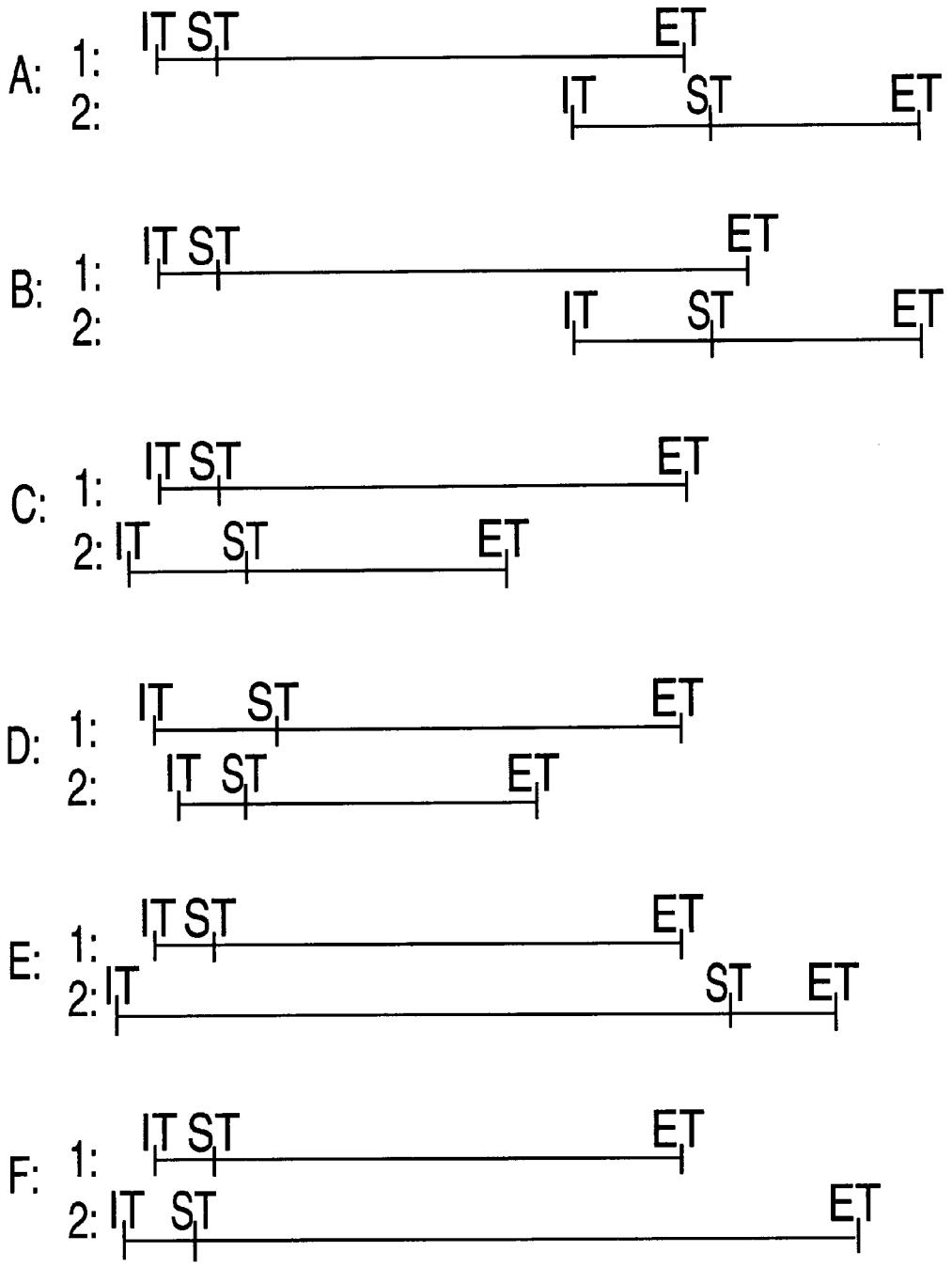

FIG. 7 shows a comparison of override scenarios of cards 1 and 2 if the issue time (IT) is used as the override criterion.

Scenario A shows normal operation: IT(2)>IT(1) and ST(2)>ST(1). Card 2 overrides card 1.

Scenario B shows IT(2)>IT(1) and ST(2)>ST(1). Card 2 overrides card 1 even if card 1 has not expired.

Scenario C shows IT(2)<IT(1). Card 2 will not override even if ST(2)>ST(1). Latest issued card is prioritized.

Scenario D shows IT(2)>IT(1) but card 2 will not override card 1 because ST(2)<ST(1).

Scenario E shows IT(2)<IT(1) and ST(2)>ST(1). Card 2 will override after time window of card 1 because then the only condition is ST(2)>ST(1).

Scenario F shows IT(2)<IT(1) and ST(2)<ST(1). Card 2 will never override, not even after time of card 1 because of earlier ST.

At first presentation of the key to the lock, the lock will check if one of the channels inherent in the lock is addressed on the card. Then the lock's card reader will compare the information on the card with the information stored in the lock. If there is a prior card allocated to that lock and if all the other information is correct, the lock will decide, depending on the override criterion type stored in the lock and encoded on the card, if access should be permitted or not. If yes, the lock will memorize the card ID and time zone and give access and cancel the former card.

If there is no prior valid card memorized in a lock channel any IT (Card issue time) will be accepted if the time window is valid. IT is therefore not working as a strict sequence number. It does not matter if one jumps over one or several cards in the issuing succession if the channel is free. The benefit of this feature is the possibility of *issuing* keys far in advance [issuing].

Looked upon as a sequence number (necessary when the lock channel is not free) is time, an ideal sequence number as it is universal and consequently does not need synchronizing between issuing stations.

For example, a travel agent may issue a card in January for a guest valid from the 4th to 6th of July and give the card to the potential guest in January. If this customer later decide not to use the room, the hotel can easily invalidate the card by issuing a new card with a later issuing date and for the same time window. The hotel does not need to have the prior issued card returned.

All key issuings may be done at the time the rooms are booked far in advance and the hotel can avoid the problems of a queue of people waiting for checking in at the front desk. This feature will be very advantageous especially for ferries and cruise ships.

The use of IT (Issuing Time) as OC (Override Criterion) will be advantageous by Resort Hotels where booking and card issuing very often will be done in advance. If, in such a situation, we have a "No show" (customer does not come), the booker will issue a new card for a new guest and due to the later IT he will thus invalidate the prior card when the present card is used the first time. ST is preferably used where the guests arrive in "batches" (ferries, cruise liners, charter hotels, vacation centra, or similar, and in connection with e.g. a ferry operating according to a strict time schedule common for all travellers.

For a normal hotel or motel the ST and IT will normally be close to simultaneous.

The access bit map system will be used if a card holder is given access to several doors in addition to his rented room in a hotel. For example, on the access bit map on his card will then be encoded e.g. Room 303 and Doors A, D, C and E where door A may be to the parking lot, door D to the swimming pool etc.

The black list system could be used to prevent access to certain rooms both for guests and employees. For example, one of the employees could e.g. be denied access to the wine cellar.

An example of useing the weekday bit map could be a charter trip by boat and hotel. It is not unusual that one company runs both ferries and hotels, and in that case a trip could consist of a cabin on boat A on Monday, a two nights stay at the hotel Tuesday and Wednesday and a cabin on boat B for the return on Thursday. Similar arrangements could also be advantageous for hotel chains and for permanent travellers. In this case the weekday bit map will be encoded on the card with validity for: Door-A-property-X-Monday. Door-B-property-Z-Tuesday-Wednesday. Door-C-property-Y-Thursday.

We claim:

1. In a lock system including at least one lock and at least one key which is adapted to hold encoded data, the lock having an electrical/mechanical lock mechanism which can be operated by the key and also having means for reading the encoded key data, means for memorizing the key data and means for comparing the key data with data stored in the lock in order to operate the lock mechanism of the lock designated as operable by the key;

the lock and the key both having property codes encoded therein, the property codes of both the key and the designated lock being required to be the same before the key can operate the lock mechanism;

the key having a card identification number encoded thereon;

the key being encoded with a valid time period designated by start and stop work times, during which valid time period the key will be effective to operate at least one lock;

[the key being effective to override and invalidate a key which had previously been effective to operate the designated lock;]

the improvement comprising:

the key having an issue time encoded thereon at the time of issue; and the system using time-related override criteria for invalidating the previous key when the key is inserted into the designated lock during the valid time period of the key and when the valid time period of the key overlaps with the valid time period of the previous key, said override criteria being based on a comparison of either the start work time of the keys or the issue time of the keys;

wherein when the start work times are used as the override criterion, a key with a later start work time will override a key with an earlier work time; and wherein when the issue times are used as the override criterion, a key having a later issue time and a later start work time will override a key having an earlier issue time.

2. The lock system of claim 1 wherein the start work time of the key can [e] *be* between one minute and four years after the issue time.

3. The lock system of claim 1 wherein the stop work time of the key can be between one minute and four years after the issue time.

4. The lock system of claim 1 wherein the key further includes a system list encoded thereon corresponding to doors and groups of doors of the system which are operable by the key.

5. The lock system of claim 1 wherein each lock may contain a black list function which lists card identification numbers which corresponds to keys which will not operate the lock.

6. The lock system of claim 1 wherein the system includes more than one property and the key may have encoded data thereon to allow the key to operate designated locks at more than one property.

7. The lock system of claim 1 further comprising the lock having means for reading out the card identification numbers of the keys which have previously operated the lock for a period of time prior to the read-out.

8. The lock system of claim 1 wherein the key further includes an override inhibit function encoded thereon which prohibits the key from being overridden.

*9. In a lock system including at least one lock and at least one key which is adapted to hold encoded data, the lock having an eletrical/mechanical lock mechanism which can be operated by the key and also having means for reading the encoded key data, means for memorizing the key data and means for comparing the key data with data stored in the lock in order to operate the lock mechanism of the lock designated as operable by the key, the improvement comprising:*

*a guest key having an access bit map function, said access bit map function listing doors and groups of doors of the lock system which are operable by the guest key such that the guest key operates more than one non-guest room while still operating one guest room door where said doors have different access code.*

*10. In a lock system including at least one lock and at least one key which is adapted to hold encoded data, the lock having an electrical/mechanical lock mechanism which can be operated by the key and also having means for reading the encoded key data, means for memorizing the key data and means for comparing the key data with data stored in the lock in order to operate the lock mechanism of the lock designated as operable by the key, the improvement comprising:*

(*a*) *a means for supplying said lock with card identification numbers which are in a black list and which will not operate the lock; and*

(*b*) *the lock having a black list function, said black list function listing card identification numbers which are in said black list and which correspond to keys which will not operate the lock even though said keys which are in said black list operate other locks.*

* * * * *